United States Patent [19]
White

[11] 3,770,127
[45] Nov. 6, 1973

[54] CARTRIDGE-TYPE FILTER ELEMENT AND HOUSING THEREFOR

[75] Inventor: Eugene B. White, Oak Park, Ill.

[73] Assignee: Filters International, Inc., Chicago, Ill.

[22] Filed: Nov. 4, 1971

[21] Appl. No.: 195,596

[52] U.S. Cl.............. 210/136, 210/193, 210/266, 210/289, 210/487
[51] Int. Cl..................... B01d 27/10, B01d 29/06
[58] Field of Search ............... 55/521; 210/39, 40, 210/75, 136, 193, 346, 418, 487, 493, 498, 210/499, 504, 506, DIG. 8, 450, 451, 452, 210/455, 266, 288, 289

[56] References Cited
UNITED STATES PATENTS

| | | | |
|---|---|---|---|
| 1,950,487 | 3/1934 | Frolander et al. ............. | 210/487 X |
| 1,304,918 | 5/1919 | Sweetland ...................... | 210/75 X |
| 3,540,587 | 11/1970 | Dawbarn....................... | 210/499 X |
| 3,358,843 | 12/1967 | Bourdale........................ | 210/487 |
| 3,595,397 | 7/1971 | Abos............................... | 210/346 X |
| 3,282,434 | 11/1966 | Pall................................. | 210/455 X |
| 2,143,044 | 1/1939 | Wicks et al..................... | 210/450 X |

Primary Examiner—Samih N. Zaharna
Assistant Examiner—Robert H. Spitzer
Attorney—Carlton Hill et al.

[57] ABSTRACT

A cartridge-type filter element in which the filter structure is of envelope-type construction with spacing means therein, the filter structure having a greater planar dimension in one direction than the corresponding dimension of a container in which it is disposed, and having a corrugated or serpentine configuration in transverse cross section along said greater dimension to permit such disposition, such container having therein a quantity of filter material in the form of discrete particles, present in an amount to provide an effective filter layer on such filter structure with the latter forming a supporting structure for such filter layer, novel housing means also being provided for one embodiment of such filter element.

27 Claims, 8 Drawing Figures

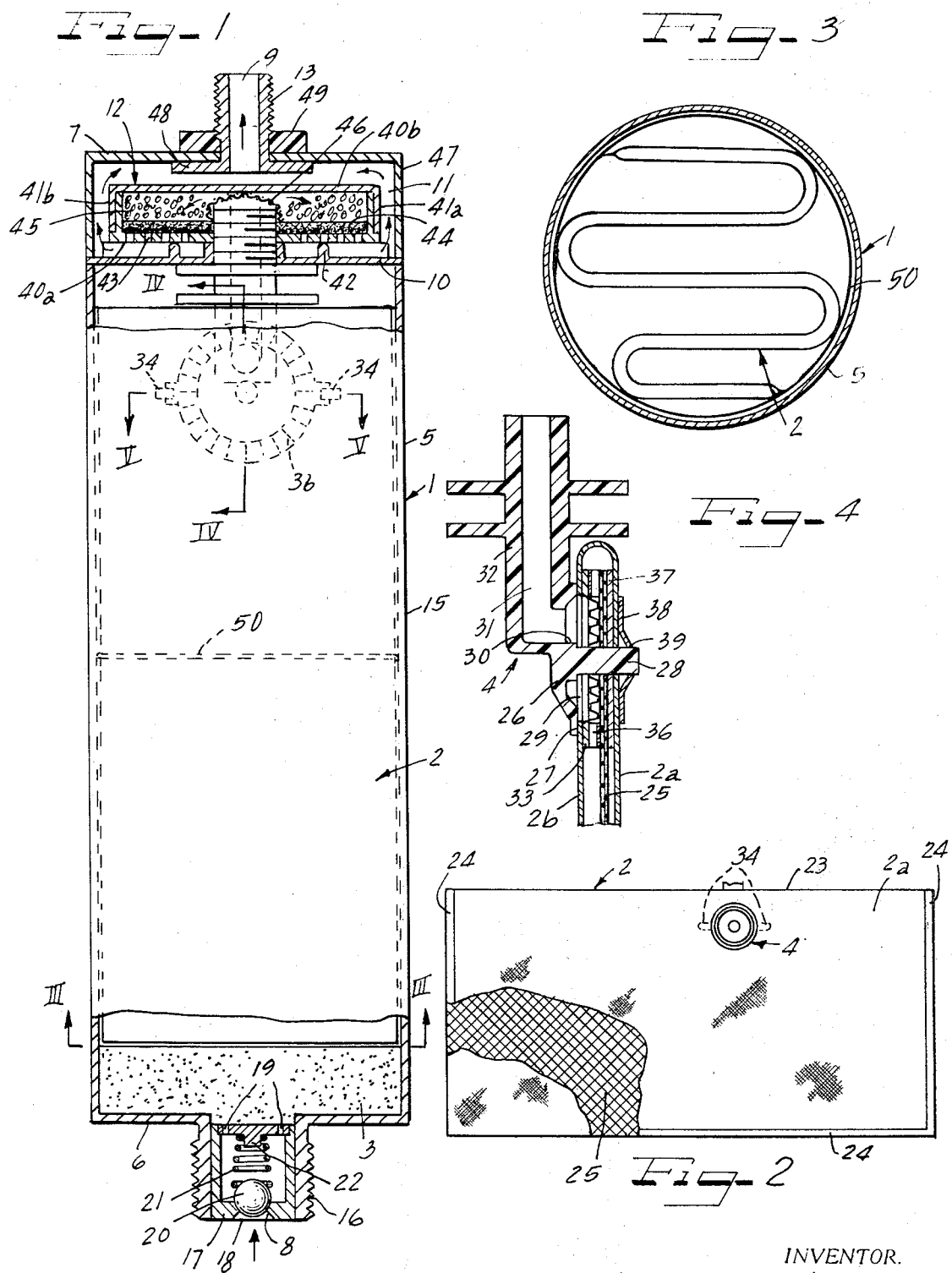

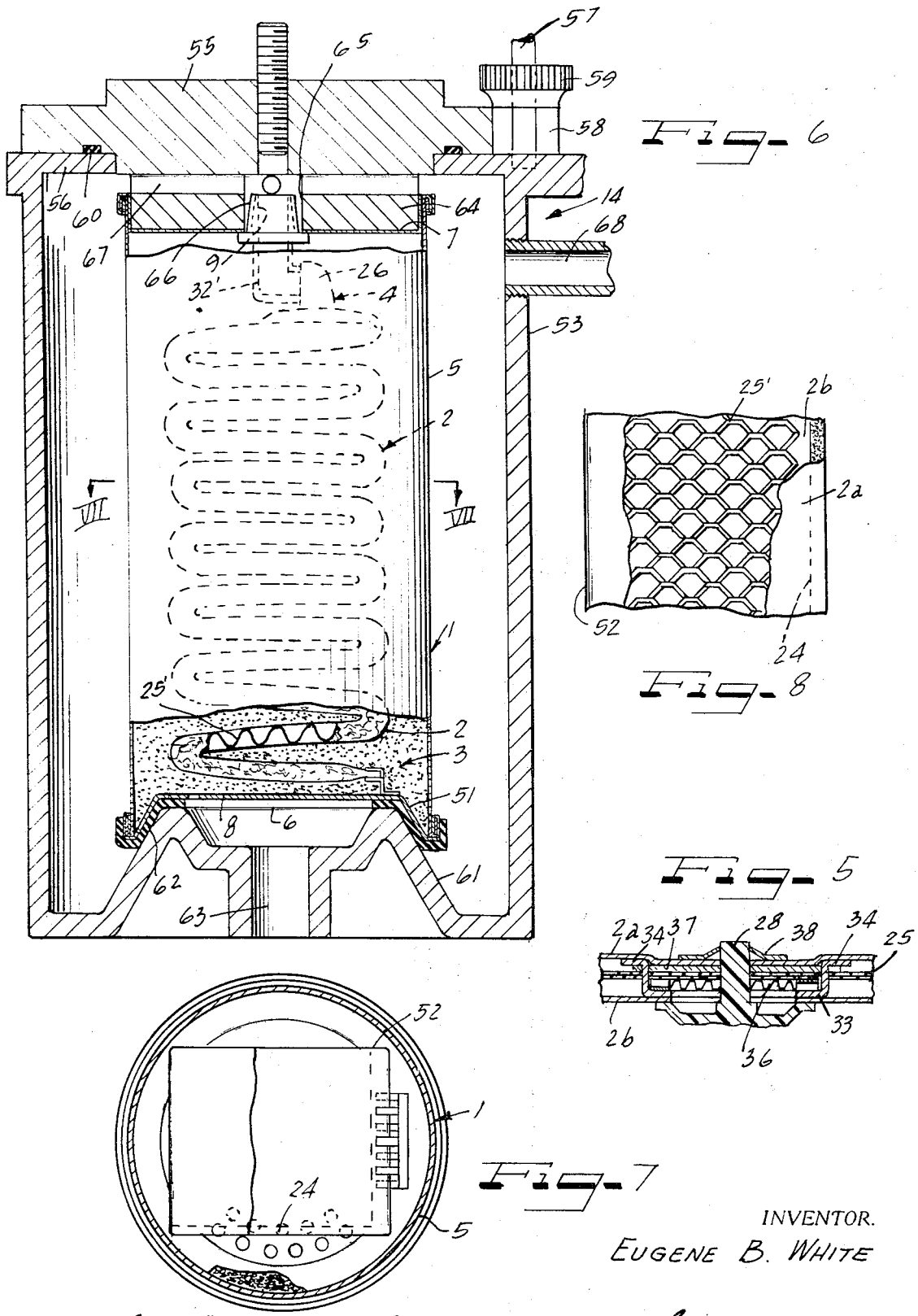

CARTRIDGE-TYPE FILTER ELEMENT AND HOUSING THEREFOR

BACKGROUND OF THE INVENTION

The present invention is directed to a filter element, of particular application as a replaceable cartridge-type device which may be readily replaced by a new structure when it has reached the end of its usable life.

Various types of filter structures have been evolved in the past, including those of the so-called "cartridge-type" but these have generally been relatively inefficient due to the usually comparatively small physical dimensions required in replaceable cartridges and the like, necessitating relatively low filtering area with correspondingly short filtering cycles before replacement is required.

In general, devices of this type in the past have usually employed either a container filled with discrete filtering material such as charcoal or carbon granules etc., or in some cases suitable sheet material such as a suitable paper, fabric, etc., having limited porosity whereby it performs a filtering function. However, as previously mentioned, such type of structures have not proved to meet high standards of filtrate purity, high flow capacity and long filtering cycles necessary to achieve a filter efficiency.

SUMMARY OF THE INVENTION

The present invention is directed to a filter device particularly adaptable as a replaceable cartridge-type filter element which may be employed until its efficiency reaches an unsatisfactory level, at which time the cartridge may be removed and discarded and replaced by a new cartridge.

The device makes use of a filter aid material in the form of discrete particles adapted to be supported on a filter structure, of generally envelope-type construction which is provided with a pair of oppositely disposed side walls, preferably directly connected to one another in sealed relation along their peripheral edges to form a filtrate chamber therein in which is disposed suitable spacing means adapted to to maintain the walls of the filter structure in spaced relation and at the same time permit flow of filtrate from the entire area of the inner surfaces of the filtrate chamber to flow to an outlet in one wall thereof. The filter structure may be formed from two planar sheets of suitable material, said sheets having a greater dimension in one direction than the corresponding dimension of the container which is to receive the same with the filter structure, when disposed in the container having a corrugated or serpentine cross sectional configuration along said greater dimension whereby the effective overall dimension of the filter structure in such direction is such that it may be received in the container. The outlet opening in the filter structure may be defined by an outlet fitting which extends to an adjacent wall of the container, through which the filtrate may be discharged.

Two illustrative preferred embodiments of the invention are shown in the drawings, one of which being particularly utilizable as a filter for a portable water supply, and the other embodiment particularly adapted for use in the filtering of hot liquids, as for example cooking or frying oils, and thus is particularly adaptable for use as a filter unit in deep fat fryers and the like to maintain the frying oil in suitable condition over prolonged periods of use.

In the first embodiment, the device includes a small secondary filter structure in series with the main filter structure to provide a high degree of pruity in the ultimate filtrate discharged from the device, while in the second embodiment, a corresponding function is achieved by the use of an impregnated material for the fabrication of the filter structure.

BRIEF DESCRIPTION OF THE DRAWINGS

In the drawings wherein like reference characters indicate like or corresponding parts, FIG. 1 is a longitudinal section through a filter element constructed in accordance with the present invention, particularly adapted for use with a comparatively small receptacle adapted to contain a supply of water which is to be rendered potable for drinking purposes;

FIG. 2 is a plan view of the filter structure employed with the construction of FIG. 1, portions of such filter structure being broken away to show the details thereof;

FIG. 3 is a sectional view taken approximately on the line III—III of FIG. 1;

FIG. 4 is a sectional view taken approximately on the line IV—IV of FIG. 1;

FIG. 5 is a sectional view taken approximately on the line V—V of FIG. 1;

FIG. 6 is a longitudinal sectional view, similar to FIG. 1, of a further embodiment of the invention, particularly adaptable for use with hot liquids and the like, and also illustrating a novel housing structure therefor;

FIG. 7 is a transverse sectional view taken approximately on the line VII—VII of FIG. 6; and FIG. 8 is a plan view of a portion of the filter structure illustrated in FIGS. 6 and 7 with portions of the side wall thereof broken away to illustrate the construction of the spacing means employed to maintain the walls of the filter structure in spaced relation.

DETAILED DESCRIPTION OF THE INVENTION

As the two embodiments of the invention illustrated in the drawing include certain generic features, a brief general description applicable to both embodiments will initially be presented followed by detailed descriptions of the respective individual embodiments.

General Construction

Referring to FIGS. 1 and 6, both embodiments of the invention employ a filter cartridge or element indicated generally by the numeral 1 having a filter structure, indicated generally by the numeral 2 disposed therein and a supply of filter material, designated generally by the numeral 3, in the form of discrete particles, for example an expanded perlitic material or the like which, in use, is adapted to be deposited upon the exterior surfaces of the filter structure 2 forming a filter layer thereon through which the liquid must pass to reach the interior of the filter element. In each case, the filter structure 2 is provided with a fitting indicated generally by the numeral 4 which forms the filtrate outlet for the filter structure 2.

The containers 1 of both embodiments are illustrated in the particular examples given as being of cylindrical configuration having a cylindrical side wall 5 and oppositely disposed end walls 6 and 7 with the respective bottom walls, as illustrated, having respective liquid inlet means 8 in the respective bottom walls 6 and a filtrate outlet 9 in the respective upper walls 7.

In the embodiment illustrated in FIG. 1, the container 1 is provided with an intermediate partition wall 10 forming a chamber 11 at the top of the container, as viewed in FIG. 1, in which is disposed a secondary filter structure indicated generally by the reference numeral 12 with the outlet 9 being defined by a suitable fitting 13 in the top wall 7.

FIG. 6 also illustrates a novel housing structure, indicated generally by the numeral 14 in which the container 1 is disposed.

The Embodiment of FIG. 1

The embodiment of the invention illustrated in FIG. 1 is particularly adapted to be employed in relatively small portable filtering units, for example, for use in the filtering unit of a small portable potable water supply. Thus, the filter structure of FIG. 1 could be incorporated as a part of a small container, for example of one or several gallons capacity, such as might be used by campers or other persons in locations remote from a commercial water supply, whereby relatively small quantities of local available water may be filtered through the unit to provide satisfactory clarity, purity etc. Adequate bacterial purification may be achieved, for example, by the use of suitable halogen water purifier tablets or the like which are commercially procurable.

In this application of the present invention the filter cartridge would be associated with a container for receiving the quantity of water to be purified and a suitable manual pump by means of which flow of contaminated water through the filter may be effected. Thus, in such application, the filter element may be provided with a suitable check valve at its inlet side, operative to insure a unidirectional flow through the filter structure and thus prevent any possibility of a reverse flow taking place during actuation of the manual pumping means.

Likewise, in this embodiment the invention where employed in connection with potable water, to provide a high degree of visual clarity control of odor and taste and polish in the filtrate, particularly desirable in connection with potable water, a secondary filter structure, indicated generally by the reference numeral 12 may be provided.

Referring to FIGS. 1–5, the container 1 may be formed of any suitable material such as metal or plastic, the latter enabling the production of a very inexpensive yet highly efficient container structure, FIG. 1 illustrating a container constructed out of plastic.

Where the bottom wall 6 is constructed of plastic, an inlet fitting 16 may be readily formed integrally therewith and, as illustrated, may be provided with external threads for effecting a connection with water supply means. Where desirable to provide a check valve, as above mentioned, such valve may be readily incorporated in the inlet fitting 16 and may, for example, be constructed in the form of an insert adapted to be disposed within and attached to the fitting 16. In the construction illustrated, the check valve structure comprises a cylindrical hollow member 17 having an exposed end wall 18 which contains the inlet opening 8. The opposite end wall of the member 17 is provided with a series of openings 19 whereby water flowing through the opening 8 may pass into the container 1. Cooooperable with the opening 8 is a ball valve member 20 which is adapted to be urged into a position closing the opening 8 by means of a small compression spring 21, one end of which bears on the ball 20 and the opposite end on a positioning boss or shoulder 22 on the adjacent end wall.

The filter structure 2, as illustrated in FIG. 2, may be constructed from a single sheet of material of rectangular shape, folded along a median line 23, to form side walls 2a and 2b, having their peripheral edge portions 24 brought into superimposed relation and secured together in sealed relation. However, prior to such sealing operation, suitable spacing means 25 is disposed between the two side walls 2a and 2b of the filter structure, the outlet fitting assembly 4 likewise being secured in place prior to such sealing operation. In the embodiment illustrated, the spacing means 25 is in the form of a netting or mesh structure constructed of suitable plastic or the like, such as polypropylene. As illustred in FIGS. 2 and 4, the spacing means 25 may comprise two series of spaced parallel strands extending in respective adjacent planes with the strands of one series extending transversely to the strands of the other series in the form of a diamond pattern. As a result of this non-woven disposition of the respective series of strands the spacing means not only performs such a spacing function, but also provides passageways through out the interior of the filter structure through which filtrate passing through the walls 2a and 2b may flow to the outlet fitting 4.

The outlet assembly 4, illustrated in detail in FIGS. 4 and 5, comprises a fitting 26 which, for example, may likewise be fabricated from a suitable plastic having an annular edge portion 27 and a concentrically disposed stem portion 28 with the edge portion 27 having an inner diameter generally corresponding to the peripheral edge of an opening 29 in the adjacent wall 2b of the filter structure. As will be clear from a reference to FIG. 4, the inner periphery of the edge portion 26 is defined by the adjacent edge of a recess 30 which communicates with the outlet passageway 31 in the tubular portion 32 of the fitting 4, the portion 32, in this emodiment of the invention being integrally connected to and formed with the remainer of the fitting.

Assembled in concentric relation with respect to the stem 28 and disposed between the sidewalls 2a and 2b of the filter structure are a plurality of members. An annular sheet metal member or ring 33 bears on the inner face of the wall 2b in opposition to the portion 27 of the fitting, thus clamping the adjacent portion of the wall 2b between the ring 33 and the portion 27. The ring 33 is also provided with a pair of diametrically oppositely disposed tongues or tabs 34. Disposed between the adjacent face of the ring 33 and the spacing means 25 is an annular shaped member 36 which, as illustrated in FIGS. 1, 4 and 5 is provided with a serpentine or corrugated circumferential cross section whereby the ring forms a plurality of radially extending passages. The members 33, 34 and spacing means 25 are retained in assembled relation by a disc-like member 37 which has a central opening of a size to receive the stem 28 and is provided with diametrically oppositely disposed slits of a size to receive the tongues 34, the free ends of which, following insertion through such slits are bent laterally outward as illustrated in FIG. 5. Following the assembly of these elements the outer wall 2a of the filter structure may be brought into relatively superimposed relation with respect to the wall 2b as illustrated in FIG. 4, the wall 2a being provided with an appropriately located opening of a size to permit passage of the stem 28 therethrough. The entire assembly is then locked in position by a retained disc 38 disposed at the outer face of the wall 2a, the disc 38 having a suitable sized opening 39 therein of suitable configuration to enable the disc to be disposed in concentric relation on the stem 28 and formed under pressure down on the stem with a friction fit. To insure adequate sealing throughout the structure, all exposed joints may be selected with a suitable plastic cement or like material to provide a completely leakproof connection between the fitting and the walls 2a and 2b.

I have found that exceptionally good results can be obtained in the fabrication of the shoulder structure by the utilization of the non-woven cellulosic filter fabric previously referred to, with the edges of the fabric being sealed by the utilization of a cellulosic heat seal tape which may be disposed between the faces of the walls and upon the application of suitable heat operative to provide an effective connection and seal between the two walls. A reinforcement by stitching could also be provided if deemed desirable. Likewise, I have found that very good results may be obtained with the use of a polypropylene plastic netting structure, the strands of which are approximately 20 mils in diameter, arranged in such a diamond pattern.

As illustrated in FIG. 1 the filter structure 2 is adapted to be disposed within the shell 15 with the filter structure, illustrated in FIG. 2 in planar configuration, folded back and forth in a corrugated or serpentine fashion as viewed from the long dimension thereof, as illustrated in FIG. 3. It thus may be inserted into the shell, with the tubular portion 32 of the fitting 4 extending upwardly through the partition wall 10, secured at its peripheral edges to the shell 15, and to the fitting 4 in sealed relation. The lower or bottom edge of the filter structure may terminate above the bottom wall 6 to provide space for the supply 3 of filter aid material.

Referring to FIG. 1, it will be noted that the receptacle 12, is illustrated as being fabricated from two members, namely a bottom member 40a and a top member 40b respectively having concentric sidewalls 41a and 41b which in the assembled structure are suitably secured together by cementing or other suitable means to provide a sealed connection therebetween.

The bottom wall 40a of the receptacle 12 is provided with a central opening therein through which the tubular portion 32 of the fitting 4 extends, the construction illustrated employing a threaded connection therebetween with the joint being suitably sealed to the stem and flange of the partition wall 10 by a plastic solvent, cement or the like. If desired the partition wall 10 may be provided with a plurality of upwardly extending projections 42 adapted to provide support for the receptacle 12.

As illustrated, the bottom wall 40a may be provided with a plurality of openings 43 therein which are covered by a filter pad 44 seated on the bottom wall 40a and disposed on the pad 44 is a quantity of activated carbon filter granules or particles 45 the latter substantially filling the receptacle and prevented from entering the bore 31 of the fitting 4 by a cup-shaped screen 46 frictionally engaged with the upper end of the portion 32 of the fitting.

The top wall 7 of the container 5 is connected to the partition wall 10 and thus to the shell 15 by a tubular wall 47, integrally formed with the wall 7 and suitably attached to the remainer of the structure is sealed relation as for example by means of plastic cement or the like, the wall 47 having the same outer diameter as the shell 15 and thus in effect forming an extension thereof. The outlet fitting 13 may be formed integrally with the wall 7, in a manner corresponding to that of the fitting 16 or, as illustrated, may be formed as a nipple having a flange 48 engaged with the inner face of the wall 7 and a ring member 49 disposed at the outer face of the wall 7, the parts being suitably assembled in sealed relation as for example by the use of a suitable cement or solvent.

In operation of the embodiment illustrated in FIG. 1, water or other liquid to be filtered is discharged into the container 5 through the inlet opening 8, resulting upon first operation of the structure in the agitation of the filter material 3 and ultimate deposition thereof on the surface of the filter structure 2, forming a filter layer over the entire external surface thereof through which the water or other liquid must flow to reach the interior of the filter structure. Liquid passing through the walls 2a and 2b of the filter structure flows therefrom through the passages formed by the spacing means 25 into the fitting 4 and upwardly through the passageway 31 therein, through the screen 46 into the receptacle 12 following which it will flow downwardly through the filter granules or particles therein, through the filter pad 44 and out through the opening 43 in the bottom 40a. The liquid is then free to flow around the exterior of the receptacle 12 and out the discharge opening 9 in the fitting 13. The pad 44 preferably is constructed with a graduated porosity, the porosity diminishing from the top face thereof toward the bottom face thereof to provide an in-depth filtering action, in addition to the filtering action preceding it. To facilitate assembly of the filter structure within the casing 15 the filter structure, following forming into a corrugated or serpentine configuration such as illustrated in FIG. 3 may be retained in such position by a centrally disposed cord 50 extending around the outer periphery of the structure, as will be readily apparent from FIG. 1.

In the event that it is desired to fabricate the container structure out of sheet metal rather than of plastic, obviously suitable metal forming and sealing techniques would be employed in lieu of the cement or solvent heretofore referred to.

THE EMBODIMENT OF FIG. 6

FIGS. 6, 7 and 8 illustrate details of another embodiment of the present invention, but which is particularly designed for filtering hot liquids, as for example the liquid oil or other liquid employed in deep fat fryers and the like, particularly commercial devices which employ a circulating supply of oil and thus which may be continuously passed hrough a suitable filter structure to enable a continuous reusing of the oil.

Referring to FIGS. 6, 7 and 8, the container 1 in this embodiment of the invention is formed from sheet metal and may be readily fabricated by the utilization of techniques employed in the manufacture of tin cans and the like. As illustrated, FIG. 6, the sidewall 5 is secured to the endwalls 6 and 7, respectively, by suitable forming of the adjoining edges and soldering. In the particular embodiment illustrated the top wall is inset with respect to the top edge of the vertical wall 5, and in like manner the lower wall 6 is similarly inset with respect to the lower edges of the vertical wall 5, the horizontally extending portion of the bottom wall being connected to the side wall 5 by a conical portion 51.

In this construction the vertical walls 5 and endwalls 6 and 7 define a single chamber in which is disposed the filter structure 2, the latter being connected through the fitting 4 to the endwall 7 by a tubular portion 32', illustrated as being formed separately from the body portion 26 of the fitting and fabricated from metal which may be soldered or otherwise secured to the endwall 7 in sealed relation with the lower end of the member 32 secured to and carrying the portion 26 of the fitting.

The filter structure 2 of FIG. 6, is of a construction generally corresponding to that heretofore described with respect to the construction of FIG. 1, comprising an elongated strip of material generally folded back upon itself along the longitudinal median line 52 thereof with the two sidewalls 2a and 2b thereof enclosing spacing means 25' and having the peripheral edges of said sidewalls secured together in sealed relation similar to the structure illustrated in FIG. 2, but resulting in a considerably longer and narrower structure.

In this construction the spacing means 25' is in the form of a metal grid, for example, a section of expanded aluminum or other metal which in turn has a longitudinal cross section of corrugated or serpentine configuration as illustrated in section in FIG. 6, FIG. 8, however, illustrating the spacing means in substantially uncorrugated disposition to illustrate the details thereof. In the type of expanded metal illustrated, the respective rows of expanded strips have an angular disposition with respect to the several planes of a sheet thereof whereby the upwardly extending portions, as viewed in FIG. 8, extend angularly i.e., at an angle with respect to the plane of the sheet so that passages are formed not only through the expanded openings but also laterally across the faces of the expanded metal sheet.

The fitting 4 is secured to the sidewalls 2a and 2b adjacent one end of the filter structure at which the outlet opening is disposed by a structure corresponding substantially to that illustrated in FIG. 4. Consequently the details thereof have not been illustrated in FIG. 6.

The material comprising the walls 2a and 2b in the construction of FIG. 6, for the use referred to, should be of composition that will withstand the oil temperatures involved and I have found that a particularly efficient material is a nonwoven fiberglass material.

In this construction a separate secondary filter structure such as that including the receptacle 12 in the construction of FIG. 1 is not required. Instead thereof I have found that very efficient results in the particular application described i.e., a deep fat oil filter, may be achieved by utilizing for the material of the sidewalls 2a and 2b a fiberglass sheet which has been impregnated with activated carbon, for example a powdered activated carbon whereby the oil passing through the walls 2a and 2b will also be subjected to the filtering action of the activated carbon. In other words instead of utilizing a separate carbon filter suitable corresponding results are achieved by incorporating the activated carbon with the sheet material for the elimination of odor, taste and color.

In the construction of FIG. 6 the elongated filter structure is folded back and forth upon itself to provide substantially corrugated or serpentine external configuration such as that illustrated in FIG. 6, the filter structure, when in its planar form corresponding to the illustration of the filter structure 2 in FIG. 2, being of considerably greater longitudinal length than the corresponding dimension (vertical dimension as viewed in FIG. 6) of the container 5. Consequently, by effecting the desired corrugated configuration the filter structure may be readily received in the container. As in the previous construction, the bottom wall 6 of the container is provided with inlet means 8, illustrated in this embodiment as comprising a plurality of openings in the bottom wall, as seen in FIG. 7, and the container 5 is adapted to hold a supply of filter material 3 with which the walls 2a and 2b are to be coated. To prevent loss of filter material prior to usage, the openings 8 may be covered with a suitable strip of adhesive tape or like material which will close the openings 8 until use and at such time the tape may be readily stripped from the bottom 6.

THE HOUSING FOR FILTER ELEMENT OF FIG. 6

The filter element of FIG. 6 is illustrated in operative position in a housing indicated generally by the numeral 14, of suitable construction having a generally cylindrical sidewall 53 operatively enclosed at one end by an endwall 54 and at its opposite end by a detachable endwall wall or cover member 55, the latter being seated on an inwardly directed flange 56 at the upper end of the sidewall 53 to which the cover member is clamped by any suitable means, as for example studs 57 extending through slots 58 in the cover member and having suitable retaining nuts or knobs 59 threaded thereon. The cover may be effectively sealed with respect to the flange 56 by a suitable gasket member 60 carried in a groove formed in the cover member.

The container 5 is supported within the housing 14 by a generally conical shaped, inwardly directed hub or boss 61 which extends generally concentric to the portion 51 of the bottom wall 6 of the container, a complementally shaped gasket member 62 being interposed between the hub 61 and the portion 51 of the container to provide an effective seal therebetween. The hub portion 61 is provided with a central bore 63 therein which forms the oil inlet of the housing and communicates with the openings 8 in the bottom wall 6, whereby oil may flow through the inlet 63 into the container 5. The cover member 55 is provided with a cylindrical portion 64 having a diameter less than the adjacent dimension between the sidewall of the container extending above the top wall 7, the portion 64 having a central bore therein in which is received the upper end of the tubular portion 32' of the fitting 4, the upper end of which has a generally tapering external surface which carries a complementary shaped sealing ring 66 adapted to engage the peripheral edges of the bore 65 and firmly support the can 5 therefrom. Communicating with the bore 65 are a plurality of radially disposed bores 67 which communicate with the interior of the housing and thus form passageways for the discharge of oil from the outlet 9 of the container 5 to the interior of the housing from which it may be discharged through an outlet pipe 68. It will be appreciated that a perfect seal between the member 66 and the sidewalls of the bore 5 is not required as any leakage therearound will likewise merely flow into the housing proper and be discharged through the pipe 68 along with oil flowing through the bores 67.

As in the previous construction, upon initial entry of liquid through the inlet 63 and into the container 5, the particles of filter material 3 will be deposited in a layer or coating on the walls 2a and 2b of the filter structure to provide an efficient filter layer thereon. It will be apparent that in either of the constructions illustrated, a sufficient amount of liquid should be initially run through the structure to insure proper formation of the layer of filter material on the filter structure prior to the actual filtering operation.

The construction of FIG. 6 illustrates a very simple yet highly efficient filter assembly which is particularly efficient in the application referred to.

As previously mentioned both constructions provide a filter arrangement which provides a relatively very large area of filter surface in a minimum volume, to achieve very efficient filter cycles of relatively long duration, thus enabling its use in comparatively small structures and in portable devices.

Having thus described my invention, it will be obvious that various immaterial changes may be made in the same without departing from the spirit and scope of my invention. I claim:

1. A cartridge-type filter element comprising a container constructed to form a filtering chamber, a quantity of filter material comprising discrete particles, a filter supporting structure for said filter material, comprising a pair of opposed flexible sidewalls formed from sheet material, said sidewalls being liquid-permeable but impereable to the particles of said filter material, which sidewalls are longer in one coordinate direction than the other coordinate direction, one of said sidewalls having an opening therein forming the filtrate outlet for the filter supporting structure, means having substantially uniform overall thickness disposed in said filter supporting structure constructed to maintain said sidewalls in substantially uniform, closely spaced relation while permitting filtrate to flow from the inner surfaces of said sidewalls to said outlet, said filter supporting structure being disposed in said chamber with said sidewalls being formed to provide a transverse cross section of corrugated configuration along said greater dimension, whereby the effective size of said filter structure in such direction is such that it permits such disposition, said container having a filtrate outlet in a wall thereof, and a liquid inlet opening in a wall thereof, communicating with said filtering chamber, and means secured to said container and said filter supporting structure operatively connecting the filtrate outlets of said container and said filter supporting structure, said filter material being disposed in said container and present in a quantity sufficient to provide an effective filter layer thereof on the exterior surface of said sidewalls of the filter supporting structure, the sidewalls of the latter forming supporting means for said filter layer with the latter being operative to filter out material that would otherwise pass through said sidewalls.

2. A filter element according to claim 1, wherein said filter supporting structure is of envelope-type construction with said sidewalls being coextensive in corresponding directions and secured to each other along their peripheral edges.

3. A filter element according to claim 2, wherein said spacing means comprises a mesh structure constructed to permit liquid flow both transversely through and longitudinally along such mesh structure.

4. A filter element according to claim 3, wherein said mesh structure is in the form of a screen of connected sets of filaments, the filaments of each set extending parallel to each other and transverse to the filaments of the other set.

5. A filter element according to claim 4, wherein said mesh structure is a polypropylene plastic netting with a diamond pattern.

6. A filter element according to claim 2, wherein said container is of elongated tubular configuration, closed at its opposite ends, said filter supporting structure having the corrugated configuration thereof extending transverse to the axis of said container.

7. A filter element according to claim 2, wherein said container is of elongated tubular configuration, closed at its opposite ends, said filter supporting structure having the corrugated configuration thereof extending in axial direction.

8. A filter element according to claim 3, wherein said mesh structure is in the form of a screen of expanded sheet metal.

9. A filter element according to claim 3, wherein said filter structure is constructed from a nonwoven porous cellulosic filter fabric.

10. A filter element according to claim 3, wherein said filter structure comprises a sheet of nonwoven porous material folded back on a median line with opposing edges sealed to one another.

11. A filter element according to claim 1, particularly for water filtration in connection with the production of a potable water supply, wherein said container is provided with a second chamber adjacent said first chamber, said filtrate outlet connecting means comprising a fitting extending into said second chamber, means disposed in said second chamber forming a receptacle with said fitting extending into said receptacle and operative to connect the interior of said filter structure with the interior of said receptacle for the passage of filtrate into the latter; said receptacle having outlet openings in a wall thereof for the passage of filtrate into said second chamber, an exterior wall of said container defining a part of said second chamber therein, and filter material disposed in said receptacle operatively interposed between the discharge openings therein and the adjacent opening of said fitting.

12. A filter element according to claim 11, wherein said container is of generally elongated tubular construction, having said second chamber disposed at one end of the container and separated from said first chamber by a partition wall, said fitting extending axially through said partition wall, said receptacle comprising a base member mounted on said fitting and a cooperable cover member.

13. A filter element according to claim 12, wherein said liquid inlet and filtrate outlet openings of the element are at opposite ends of said container, and a check valve disposed in said inlet opening arranged to prevent liquid flow externally therethrough.

14. A filter element according to claim 12, wherein said receptacle is mounted on said inlet fitting in spaced relation to the walls of said second chamber with the mounting wall of said receptacle being provided with said outlet openings for the discharge of liquid into said second chamber.

15. A filter element according to claim 11, wherein the filter means in said receptacle comprises particles of activated carbon and a filter pad interposed between said activated carbon particles and the openings in said receptacle.

16. A filter element according to claim 15, wherein said filter pad is constructed to provide greater porosity therethrough adjacent the inlet face thereof than adjacent the outlet face thereof whereby an in-depth filtering is effected.

17. A filter element according to claim 16, wherein said filter pad is constructed from cellulosic fibers.

18. A filter element according to claim 1, wherein said container is of elongated tubular construction, said filter supporting structure being constructed from an elongated sheet of porous material folded along its longitudinal median line with opposing edges secured in sealed relation, forming an elongated envelope structure, said spacing means comprising a screen of expanded sheet metal, the length of said elongated sheet being greater than the corresponding dimension of the container, said envelope being folded in alternate directions at spaced intervals along its length to form a corrugated or serpentine configuration, the overall length of which may be contained in said container, one end of the latter having said liquid inlet opening therein, the opposite end having said connecting means secured thereto and forming the filtrate outlet for said container, the filtrate outlet opening of said filter supporting structure being disposed adjacent the end thereof at said opposite container end and connected to said connecting means.

19. A replaceable cartridge-type filter assembly comprising a cartridge-receiving housing of tubular configuration having a pair of oppositely disposed end walls connected by tubular sidewalls, one of said end walls being constructed for detachment therefrom to provide access to the housing interior, the other end wall having an inwardly directed conical boss, provided with a centrally disposed liquid inlet passageway therein, the tubular wall having a filtrate outlet opening therein, a cover member having an inwardly extending boss therein provided with a centrally disposed bore therein and a plurality of radially extending bores therein forming connecting passageways between said bore and said filtrate outlet, and a filter cartridge disposed in said housing supported by said bosses, and a filter cartridge disposed in said housing comprising an elongated tubular-shaped container having a liquid inlet opening at one end and a filtrate outlet opening at the other end, means on said container at the inlet end thereof for detachable sealing engagement with said conical boss to provide communication between said inlet openings of the housing and container, and means at the other end of said container for detachable sealing engagement with the adjacent boss thereat to provide communication between said container filtrate outlet and said central bore, and a filter structure disposed in said container operatively interposed between the liquid inlet and filtrate outlet thereof.

20. A replaceable cartridge-type filter assembly according to claim 19, in which said filter cartridge container is provided with a fitting extending through the adjacent end wall of said filter container and provided with a conical outer surface disposed in said central bore and engaged in sealing engagement with the sidewall thereof, said fitting extending into said container and secured to said filter structure at said filtrate opening therein, providing supporting means for said filter structure and operatively connecting the interior of the latter with said bore.

21. A replaceable cartridge-type filter assembly according to claim 20, wherien the end wall of said cartridge container having the liquid inlet opening therein has a central inlet portion connected to the tubular sidewalls by an outwardly diverging conical portion, a sealing ring disposed on said conical portion engageable in sealing engagement with the conical face of said conical boss to provide communication between the liquid inlet opening in the latter and the liquid inlet opening in the container.

22. A cartridge-type filter assembly according to claim 19, wherien said filter cartridge is constructed to form a filtering chamber in which said filter structure is disposed, the latter comprising a pair of opposed flexible, liquid-permeable sidewalls formed from sheet material, which sidewalls are longer in one coordinate direction than in the other coordinate direction, one of said sidewalls having an opening therein forming the filtrate outlet for the filter structure, means disposed in said filter structure constructed to maintain said sidewalls in spaced relation while permitting filtrate to flow from the inner surfaces of said sidewalls to said outlet, said filter structure being disposed in said chamber with said sidewalls being formed to provide a transverse cross section of corrugated configuration along said greater dimension, whereby the effective size of said filter structure in such direction is such that it permits such disposition, said container having a filtrate outlet in a wall thereof, and a liquid inlet opening in a wall thereof communicating with said filter chamber, a fitting secured to said container and said filter structure, operatively connecting the filtrate outlets of said container and said filter structure, and a quantity of filter material comprising discrete particles disposed in said container and present in a quantity sufficient to provide an effective filter layer on the exterior surface of said sidewalls of the filter structure, the latter forming supporting means for said filter layer.

23. A filter replaceable cartridge-type filter assembly according to claim 22, wherein said filter structure is of envelope-type construction with said sidewalls being coextensive in corresponding directions and secured to each other along their peripheral edges.

24. A filter replaceable cartridge-type filter assembly according to claim 23 wherein said spacing means comprises a mesh structure constructed to permit liquid flow both transversely through and longitudinally along such mesh structure.

25. A replaceable cartridge-type filter assembly according to claim 22, wherein said container is of elongated tubular construction, said filter structure being constructed from an elongated sheet of porous material folded along its longitudinal median line with opposing edges secured in sealed relation, forming an elongated filter structure, said spacing means comprising a screen of expandable sheet material, the length of said elongated sheet being greater than the length of the container, said envelope being folded in alternate directions at spaced intervals along its length to form a corrugated or serpentine configuration, the overall length of which may be contained in said container, one end wall of the latter having said liquid inlet opening therein, the opposite end having said fitting secured thereto and forming the filtrate outlet for said container, the filtrate outlet opening of said filter structure being disposed adjacent one end thereof.

26. A replacement cartridge-type filter assembly according to claim 19, wherein said filter cartridge is provided with a fitting extending through the adjacent end wall of said filter container and provided with a conical outer surface disposed in said central bore and engaged in sealing engagement with the sidewall thereof, said fitting extending into said container and secured to said filter structure at said filtrate opening therein, providing supporting means for said filter structure and operatively connecting the interior of the latter with said bore.

27. A replacement cartridge-type filter assembly according to claim 19, wherein the end wall of said cartridge having the liquid inlet opening therein has a central inlet portion connected to the tubular sidewalls by an outwardly diverging conical portion, a sealing ring disposed on said conical portion engageable in sealing engagement with said boss to provide communication between the liquid inlet opening in the latter and the liquid inlet opening in the cartridge.

* * * * *